March 24, 1964
G. E. FRANCK
3,126,194
VALVE WITH ANTI-TORREFYING COUPLING MEANS
Filed Sept. 15, 1960
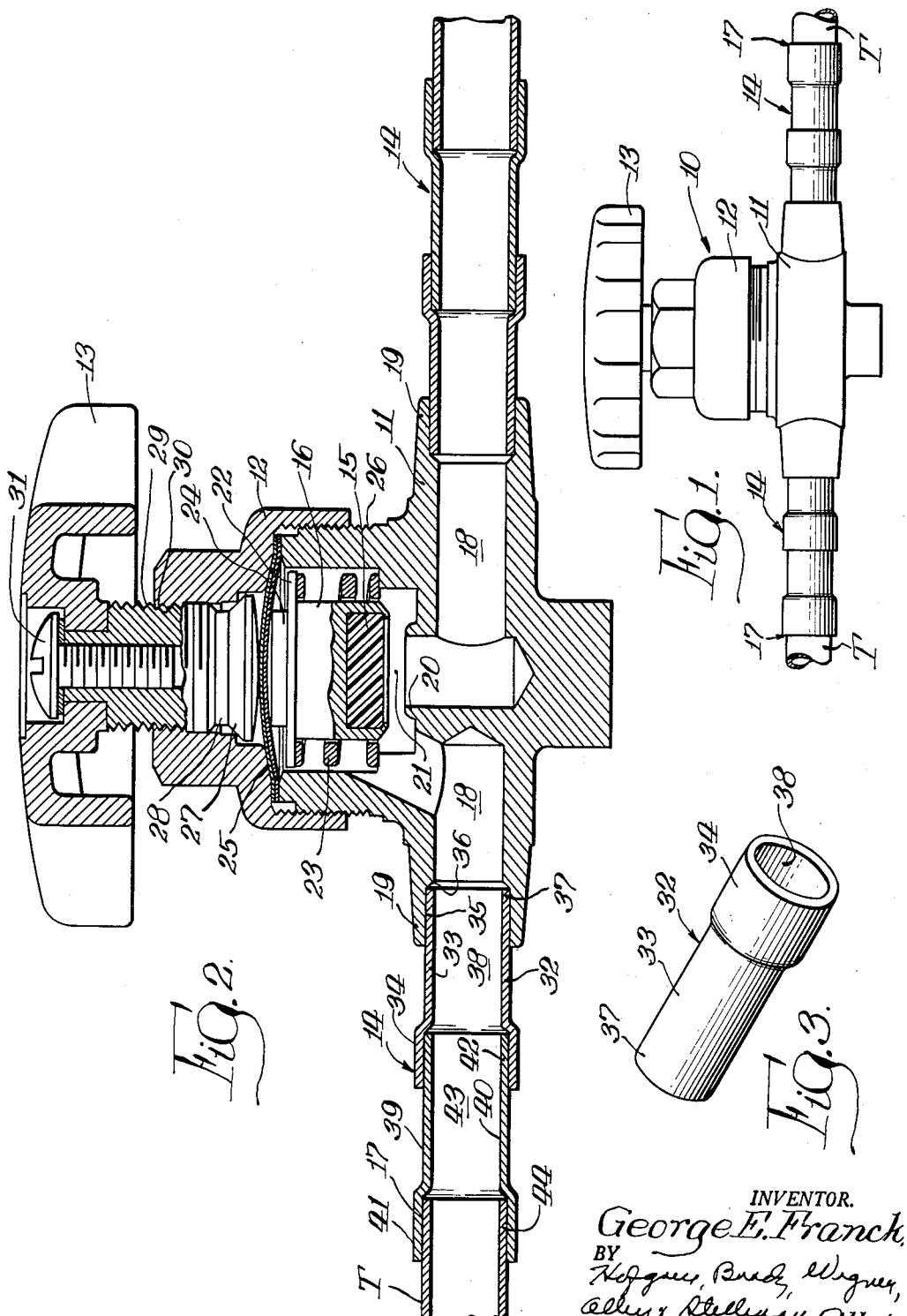
INVENTOR.
George E. Franck,
BY

United States Patent Office 3,126,194
Patented Mar. 24, 1964

3,126,194
VALVE WITH ANTI-TORREFYING
COUPLING MEANS
George E. Franck, Morton Grove, Ill., assignor to Imperial-Eastman Corporation, a corporation of Illinois
Filed Sept. 15, 1960, Ser. No. 56,299
4 Claims. (Cl. 251—148)

This invention relates to valves and in particular to anti-torrefying coupling means for use in valves.

In installing a valve in a fluid conduit such as the tubing of a refrigeration system, the valve is conventionally coupled to the tubing as by soldering or brazing. A serious problem arises in such coupling of the valve to the refrigeration line where the seating portion of the valve is formed of a material such as a plastic which may be damaged by the heat generated during the soldering or brazing operation and conducted to the seating portion through the metallic elements of the valve. To avoid this problem, it has been necessary to remove the seating portion during the coupling operation. This is undesirable, as the factory tested seal of the valve is thusly broken and resealing thereof in the refrigeration system is relatively difficult.

The present invention is concerned with eliminating this problem of undesirable heat transfer to the heat susceptible portions of such valves during the coupling thereof to the fluid flow line. A principal object of the present invention is, therefore, to provide a new and improved valve having anti-torrefying coupling means.

Another object of the invention is to provide such a valve including means having low thermal conductivity interposed between the portion of the valve to be coupled to the fluid flow tubing and portions of the valve susceptible to damage by heat generated during such coupling.

A further object is to provide such a valve including such means for precluding heat transfer while permitting fluxless soldered connection of the valve to the fluid flow conduit.

Still another object of the invention is to provide such a valve which is simple and economical of construction.

A yet further object of the invention is to provide such a valve for controlling fluid flow through a copper conduit, including a body member defining a fluid flow passage, a valve movable in the flow passage for controlling fluid flow therethrough, the valve including a seating portion formed of a material such as a plastic, a first tubular element formed of a material having low thermal conductivity and having an inner end connected to the body member to define an outward extension of the flow passage, and a second tubular element formed of copper and having an inner end connected to the first tubular member to define a further extension of the flow passage, and an outer portion adapted for fluxless soldered connection to a copper conduit for fluid flow therebetween.

Other features and advantages of this invention will be apparent from the following description taken in connection with the accompanying drawings wherein:

FIG. 1 is an elevation of a valve embodying the invention with portions of the fluid flow conduit connected thereto;

FIG. 2 is an enlarged diametric section thereof;

FIG. 3 is an isometric view of the anti-torrefying element of the valve.

In the exemplary embodiment of the invention as disclosed in the drawing, a valve generally designated 10 is shown to include a body member 11, a cap 12, an operating handle 13, and means generally designated 14 for coupling the valve to a fluid flow conduit defined by tubing T. The present invention is primarily concerned with precluding undesirable heat transfer to a seating portion 15 of a movable valve member 16 from the connection 17 between the coupling means 14 and the tubing T.

More specifically, the valve body member 11 defines a through flow passage 18 terminating at its opposite ends in annular bosses 19 at opposite sides of the body member. Intermediate its ends, the flow passage is defined by an annular valve seat 20 opening into a control chamber portion 21 of the flow passage in which the movable valve 16 is disposed. The seating portion 15 may be formed of a material which is susceptible to damage by heat such as generated during the brazing or soldering connection of the valve to the fluid conduit T. Illustratively, the seating portion may be formed of a plastic such as nylon. The seating portion is carried by the valve portion 16 for selective engagement with the valve seat 20 to close the flow passage 18 and spaced relationship with the valve seat 20 to permit fluid flow through the passage 18. Herein the valve member 16 includes an annular flange 22 co-operating with a compression spring 23 seated on the body member 11 coaxially of valve seat 20 to urge an outer button portion 24 thereof outwardly relative to chamber 21 and against a diaphragm 25 sealingly closing the outer end of the chamber 21. The diaphragm is retained in sealing engagement with the body member 11 by the cap 12 which is threadedly secured to an exteriorly threaded portion 26 of the body member concentric of chamber 21. The handle 13 serves to urge the diaphragm 25 inwardly against the action of spring 23 by adjustably positioning the inner end 27 of a stem 28 in the cap 12. For this purpose, the stem 28 is provided with a threaded mid-portion 29 co-operating with a threaded bore 30 extending through the cap 12 coaxially of the chamber 21. The handle is fixedly secured to the outer end of the stem 28 by suitable means such as screw 31.

Each of the coupling means 14 is identical and the following description thereof is limited to that comprising the left-hand coupling means as shown in FIG. 2, it being understood that the description applies equally well to the right-hand coupling means therein. More specifically, the coupling means 14 includes a first tubular element 32 having an inner cylindrical portion 33 and a radially enlarged outer cylindrical portion 34. Boss 19 of the valve body member 11 is provided with an outwardly opening cylindrical recess 35 terminating inwardly in a frusto-conical shoulder 36 at the outer end of the flow passage 18. The outer diameter of the inner end portion 33 of tubular element 32 is preferably comparable to the diameter of recess 35 whereby the inner end 37 may be sealingly secured to the body member 11 therein to provide an outward extension 38 of the flow passage 18. The tubular element 32 is preferably formed of a material having a low thermal conductivity, such as stainless steel having a thermal conductivity K factor of approximately 12 or nickel silver having a thermal conductivity K factor of approximately 17 ($K$=B.t.u./hour/ square feet/° F./feet of thickness).

The coupling means 14 further includes a second tubular element 39 having a cylindrical inner end portion 40 and a radially enlarged cylindrical outer end portion 41, which may have a configuration generally similar to that of inner tubular element 32. The outer diameter of the inner portion 40 is preferably comparable to the inner diameter of the outer portion 34 of the first tubular element 32 whereby the inner end 42 of portion 40 may be sealingly secured in the outer portion 34 of the first tubular element to define a second extension 43 of the fluid flow passage 18. The inner diameters of the inner portion 33 of the first tubular element 32 and the inner portion 40 of the second tubular element 39 are preferably equal to the inner diameter of the tubing T. The inner diameter of the outer portion 41 of element 39 is preferably comparable to the outer diameter of the tubing T to permit the end 44 of the tubing to be readily inserted thereinto.

The outer tubular element is preferably formed of copper, permitting a fluxless soldered or brazed connection 17 with the copper tubing T. Illustratively, the brazed connection may be made with a silver-phosphor alloy. Thus, the possibility of contaminating the fluid flow passage as when flux is required in connecting the conduit to the valve is effectively eliminated.

By virtue of the interposition of the first tubular element between connection 17 and body member 11, heat generated during the soldering or brazing operation is effectively precluded from passing to the body member and thence to the heat susceptible seating portion 15 of the valve member therein. Resultingly, it is unnecessary to disassemble the valve to preclude damage to the seating portion 15 during coupling of the valve to the tubing T. As the valve need not be disassembled, the seal of the diaphragm 25 with the body member across the chamber 21, conventionally provided at the factory, is unbroken, effectively eliminating the problem of attempting to reseal the valve in the field. By virtue of the relatively small ratio of the thermal conductivity of the first tubular element to the thermal conductivity of the copper second tubular element and body member, the first tubular element may be quite short effectively minimizing the size of the valve and effectively minimizing the cost thereof.

While I have shown and described one embodiment of my invention, it is to be understood that it is capable of many modifications. Changes, therefore, in the construction and arrangement may be made without departing from the spirit and scope of the invention as defined in the appended claims.

I claim:
1. A valve for controlling fluid flow through a conduit, comprising: a body member defining a fluid flow passage and formed of a material having high thermal conductivity; a valve movable in said flow passage for controlling fluid flow therethrough, said valve including a portion formed of a material susceptible to damage by heat such as generated during a fluxless soldered connection of the valve; a tubular element formed of a material having a thermal conductivity substantially lower than that of the body member and having an inner end sealingly connected to the body member to define an outward extension of said flow passage, said tubular element further having an outer end; and means on said outer end of said tubular element arranged for fluxless soldered connection thereof to a conduit, the spacing of said outer end of the tubular element from the inner end being preselected with respect to the thermal conductivity of the tubular element to preclude passage from said connection means during a soldered connection thereof to a conduit of sufficient heat to said valve portion to damage said valve portion.

2. The valve of claim 1 wherein said tubular element is formed of a material having a thermal conductivity K factor less than approximately 20.

3. The valve of claim 1 wherein said tubular element is soldered to the body and said heat damageable portion of the valve is installed therein subsequent to the soldering of said tubular element to said valve body.

4. A valve for controlling fluid flow through a conduit, comprising: a metal body member defining a fluid flow passage; a valve movable in said flow passage for controlling fluid flow therethrough, said valve including a seating portion formed of nylon; a first tubular element formed of a material having a thermal conductivity K factor less than approximately 20 and having an inner end sealingly connected to the metal body member to define an outward extension of said flow passage, said tubular element further having an outer end; and a second tubular element sealingly connected to said outer end of said first tubular element and arranged for fluxless soldered connection thereof to a conduit, the spacing of said outer end of the first tubular element from the inner end thereof being preselected with respect to the thermal conductivity of the first tubular element to be effectively minimum to preclude passage from said second tubular element during a soldered connection thereof to a conduit of sufficient heat to said valve portion to damage said valve portion.

References Cited in the file of this patent

UNITED STATES PATENTS

| | | |
|---|---|---|
| 1,662,263 | Harris | Mar. 13, 1928 |
| 2,034,418 | Plant | Mar. 17, 1936 |
| 2,147,244 | Cornell | Feb. 14, 1939 |
| 2,190,362 | Keener | Feb. 13, 1940 |
| 2,920,861 | Hartmann | Jan. 12, 1960 |
| 2,922,616 | Budde | Jan. 26, 1960 |
| 3,003,330 | Coad | Oct. 10, 1961 |

FOREIGN PATENTS

| | | |
|---|---|---|
| 203,531 | Australia | Nov. 11, 1954 |